United States Patent
Kim et al.

(10) Patent No.: US 12,468,287 B2
(45) Date of Patent: Nov. 11, 2025

(54) SYSTEM AND METHOD FOR CONDITIONING VEHICLE BATTERY

(71) Applicants: Hyundai Motor Company, Seoul (KR); Kia Corporation, Seoul (KR)

(72) Inventors: Tae Hyuck Kim, Seoul (KR); Hyun Soo Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 425 days.

(21) Appl. No.: 17/986,365

(22) Filed: Nov. 14, 2022

(65) Prior Publication Data

US 2023/0280720 A1 Sep. 7, 2023

(30) Foreign Application Priority Data

Mar. 4, 2022 (KR) .................. 10-2022-0028373

(51) Int. Cl.
*G05B 19/4155* (2006.01)
(52) U.S. Cl.
CPC .......... *G05B 19/4155* (2013.01); *G05B 2219/50333* (2013.01)
(58) Field of Classification Search
CPC ...... G05B 19/4155; G05B 2219/50333; B60L 2240/545; B60L 2240/622; B60L 2260/52; B60L 58/24; B60L 58/26; B60L 53/00; B60L 58/10; B60L 58/12; B60L 58/27; Y02E 60/10; Y02T 10/70; Y02T 10/7072; Y02T 90/12; H01M 10/625; H01M 10/63; B60Y 2200/91
See application file for complete search history.

(56) References Cited

U.S. PATENT DOCUMENTS

| | | | |
|---|---|---|---|
| 2012/0029724 A1* | 2/2012 | Formanski | H01M 10/443 324/426 |
| 2018/0072181 A1* | 3/2018 | Christen | H01M 10/625 |
| 2019/0315232 A1* | 10/2019 | Ing | B60L 58/26 |
| 2020/0343601 A1* | 10/2020 | Carlson | B60L 58/26 |
| 2021/0031654 A1* | 2/2021 | Vizzini | B60L 58/12 |

FOREIGN PATENT DOCUMENTS

KR 10-2021-0082381 A 7/2021

* cited by examiner

*Primary Examiner* — Christopher E. Everett
(74) *Attorney, Agent, or Firm* — Banner & Witcoff, Ltd.

(57) ABSTRACT

A system and a method for conditioning a vehicle battery are proposed. The system for conditioning a vehicle battery may include a temperature controller configured to adjust a temperature of the vehicle battery, and one or more processors configured to obtain determination factor data. The determination factor data may include vehicle condition data and/or driving information data. The one or more processors may be further configured to determine a target temperature of the battery based on the determination factor data, and control the temperature controller to adjust the vehicle battery to the target temperature.

17 Claims, 3 Drawing Sheets

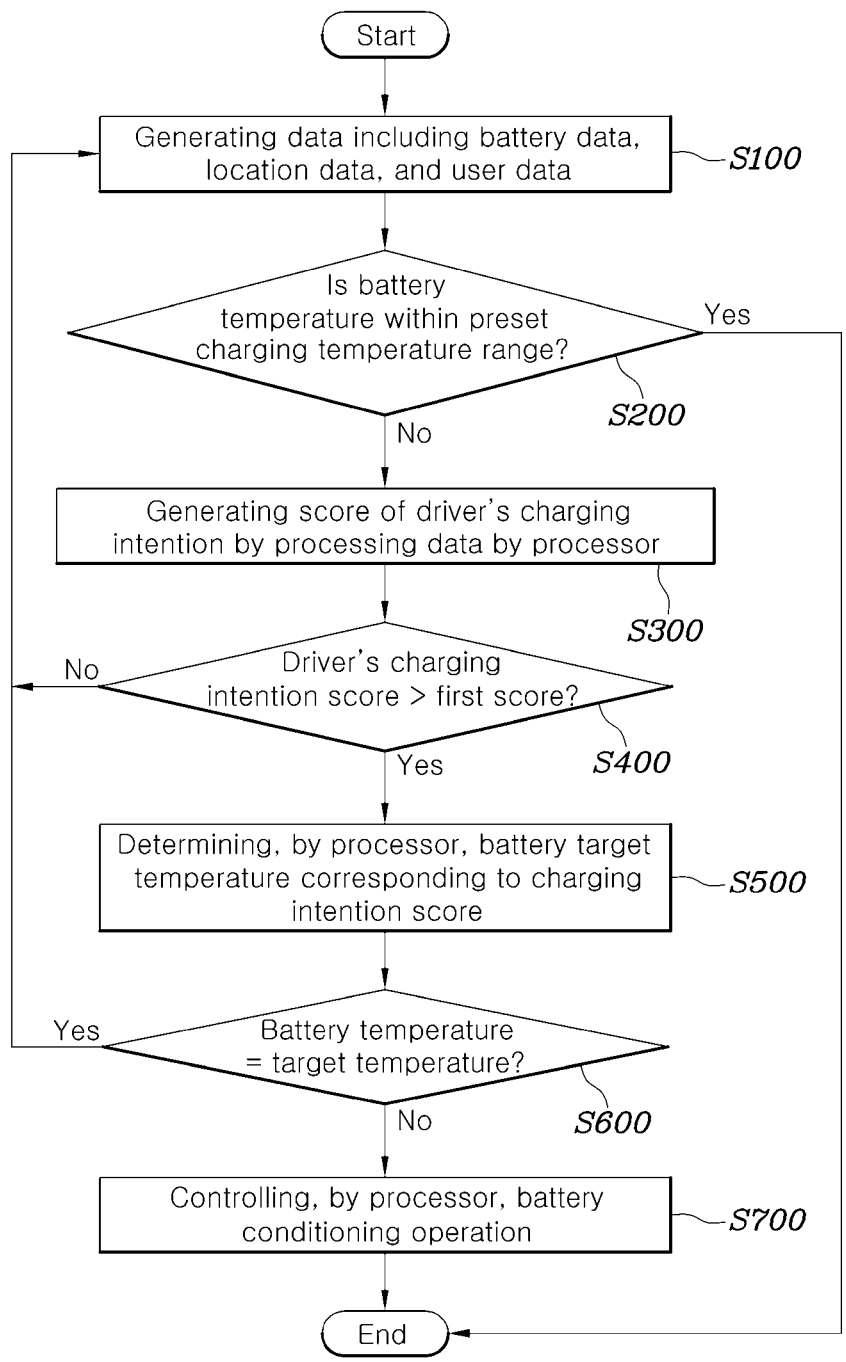

SYSTEM AND METHOD FOR CONDITIONING VEHICLE BATTERY

CROSS REFERENCE TO RELATED APPLICATION

The present application claims priority to Korean Patent Application No. 10-2022-0028373, filed Mar. 4, 2022, the entire contents of which are incorporated herein for all purposes.

BACKGROUND

Field

The present disclosure relates to a system and a method for conditioning a vehicle battery.

Description of the Related Art

In recent years, as environmental issues have become important, eco-friendly vehicles such as electric vehicles have been developed and distributed.

Eco-friendly vehicles need to charge a battery thereof at a charging station, and since the charging efficiency of the battery varies greatly depending on the temperature condition, it is necessary to maintain the temperature of the battery well during charging.

However, when the battery temperature is too low or too high depending on the driving environment, the charging efficiency of the battery may be lowered, and thus energy may be wasted and the charging time may be delayed, and the battery durability may be also deteriorated.

Therefore, it may be necessary to condition the battery to an optimum temperature in advance before charging.

The foregoing is intended merely to aid in the understanding of the background of the present disclosure, and is not intended to mean that the present falls within the purview of the related art that is already known to those skilled in the art.

SUMMARY

Accordingly, the present disclosure has been made keeping in mind the above problems occurring in the related art, and the present disclosure is intended to provide a system and a method for conditioning a vehicle battery, wherein the system and the method for conditioning a vehicle battery are configured to check a driver's intention to charge the battery by not only simply depending on a driver's input, but also considering a battery condition, driving information, or learning information and to vary a degree of the battery conditioning in response to a degree of the driver's intention to achieve efficient and precise battery conditioning.

In order to achieve the above objectives, according to one aspect of the present disclosure, there is provided a system for conditioning a vehicle battery. The system may include: a temperature controller configured to adjust a temperature of the vehicle battery; and one or more processors configured to obtain determination factor data, the determination factor data including at least one of vehicle condition data or driving information data; determine a target temperature of the battery based on the determination factor data; and control the temperature controller to adjust the temperature of the vehicle battery to the target temperature.

The vehicle condition data may include battery condition data. The driving information data may include history information data.

The battery condition data may include at least one of battery state of charge (SOC) data or battery temperature data.

The driving information may further include information regarding at least one of: whether a charging station is set as a destination, comparison between a distance to the destination and an available driving distance, or a remaining battery SOC after arrival at the destination.

The history information may include information regarding at least one of: a most typical charging time slot associated with a vehicle, or a most frequently used charging station associated with the vehicle.

The one or more processors may be configured to generate a score based on the determination factor data, and determine the target temperature of the vehicle battery based on the score.

The one or more processors may be configured to determine the target temperature based on a mapping between the score and the target temperature.

The one or more processors may be configured to control the temperature controller to adjust the temperature of the vehicle battery may reach the target temperature based on the vehicle battery being out of a normal temperature range.

A method for conditioning a vehicle battery may include: generating determination factor data including at least one of vehicle condition data or vehicle driving information data; determining, by the one or more processors, a target temperature of a vehicle battery based on the determination factor data; and controlling, based on the target temperature, a temperature controller to cool or heat the vehicle battery.

The vehicle condition data may include battery temperature data.

Controlling the temperature controller may include: determining, by the one or more processors, whether a temperature of the vehicle battery is within a normal temperature range; and based on the temperature of the vehicle battery being out of the normal temperature range, controlling the thermal management system to cool or heat the vehicle battery based on the target temperature.

Determining the target temperature may include: generating a score based on the determination factor data; and determining the target temperature based on the score.

A vehicle may include a battery, a temperature controller, one or more processors, and memory storing instructions. The instructions, when executed by the one or more processors, may cause the system to: determine, based on at least one of vehicle condition data or vehicle driving information data, a score indicating a predicted likelihood of charging the battery; determine, based on the score, a target temperature of the battery; and control, based on the target temperature, the temperature controller to adjust a temperature of the battery.

According to the present disclosure, the system and the method for conditioning a vehicle battery are configured to check a driver's intention to charge the battery by not only simply depending on a driver's input, but also considering battery condition, driving information, or learning information, and to vary a degree of the battery conditioning in response to a degree of the driver's intention, so that the efficient and precise battery conditioning can be performed.

BRIEF DESCRIPTION OF THE DRAWINGS

The above and other objectives, features, and other advantages of the present disclosure will be more clearly under

FIG. 3 is a flowchart of an example method for conditioning a vehicle battery.

DETAILED DESCRIPTION

The present disclosure relates to a system and a method for pre-conditioning the temperature of a vehicle battery before charging. A battery should be recharged in an optimum temperature because the temperature of the battery affects the efficiency of the battery at charging and the durability of the battery.

Therefore, when battery rechargeability during driving is calculated and the temperature of the battery is controlled based on the probability in advance, the battery may be recharged at high efficiency, thereby having advantages of reducing energy waste, reducing charging time, and maintaining the durability of the battery.

For this reason, the present disclosure relates to relatively precisely determining the battery rechargeability or driver's battery recharging intention by collecting and integrating various types of information, and to change a target temperature of the battery on the basis of a degree of the charging intention, the battery rechargeability, and/or a battery condition, thereby improving both the recharging efficiency and the vehicle energy efficiency.

Figure 1:
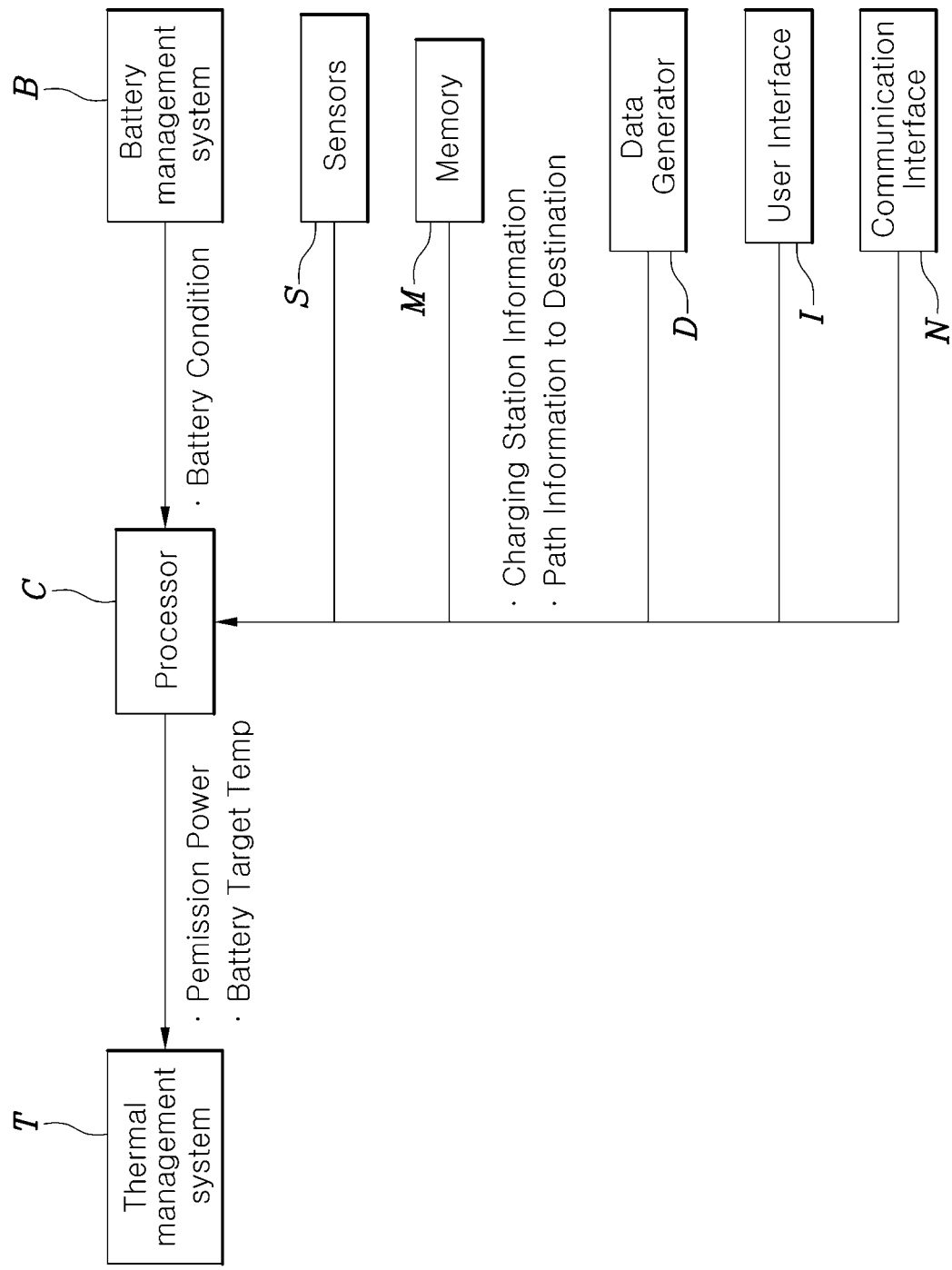
- FIG. 1 is a block diagram showing an example system for conditioning a vehicle battery.

Specifically, FIG. 1 is a block diagram showing an example system for conditioning a vehicle battery. The system for conditioning a vehicle battery may include: a thermal management system T (e.g., a temperature controller, a cooler, a heater, etc.) adjusting the temperature of the vehicle battery; a data generator D that generates (e.g., collects, processes, etc.) determination factor data including a vehicle condition or driving information; and a processor C that determines a target temperature of the battery by using the determination factor data of the data generator D, and controlling the thermal management system T so that the battery reaches the target temperature in the battery temperature control.

The thermal management system T (also referred to as a temperature controller, a thermostat, a thermoregulatory, etc.) may control the temperature of the battery, directly or indirectly. The thermal management system T may include, for example, a cooler and/or a heater. Therefore, the thermal management system may be configured to use coolant, refrigerant, and/or air, and to be heat-exchangeable with not only the battery, but also other various vehicle parts such as a motor, an electric heat device, etc. Through this configuration, the thermal management system T may adjust the temperature of the vehicle battery.

The data generator D may collect and/or generate data on which the determination (e.g., target temperature, battery rechargeability) is based. The data generator D may be a sensor, a memory, or a processor. The data generator D may generate the determination factor data (e.g., data that are used as factors for making a determination). The determination factor data may include including a vehicle condition or driving information, and the processor C may determine the battery rechargeability (e.g., battery recharging performance) by using the determination factor data.

The processor C (e.g., one or more processors) may determine the target temperature by using the determination factor data obtained from the data generator D, when controlling the battery temperature, and may control the thermal management system T so that the battery reaches the target temperature.

The processor C may include a nonvolatile memory (not shown), which may store instructions (e.g., an algorithm) configured to control operations of various components of a vehicle or data regarding software instructions to execute the algorithm, and a processor (not shown), which may be configured to perform operations described below using the data stored in the memory. The memory and processor may be implemented as separate chips. Alternately, the memory and processor may be implemented as a single integrated chip. The processor may have one or more forms, such as a central processing unit (CPU), an application-specific integrated circuit (ASIC), a system-on-a-chip (SoC), etc.

Sensors S may check a vehicle condition or a battery condition to provide the data to the processor C or a battery management system B, and may measure the battery temperature. The battery management system B may collect information about the battery temperature or state of charge (SOC) through the sensors S and provide the information to the processor C.

A memory M may store some or all of the information discussed herein, and may store the battery information and/or driving information. The memory M may also transmit this information to the processor C.

The data generator D may collect data on which the determination is based and transmit the data to the processor C. Then, the driver may input (e.g., select) a charging station through a user interface I. The driver may, via the user interface I, initiate or stop battery conditioning directly. The user interface I may include an instrument cluster, a touchscreen display, a console, a heads-up-display (HUD), a smartphone, a tablet device, a personal computer (PC), etc.

Furthermore, a communication interface N may perform communication between a terminal (e.g., instrument cluster, console, etc.) of the driver and the vehicle, and allow the vehicle to collect and exchange data regarding external traffic conditions.

Figure 2:
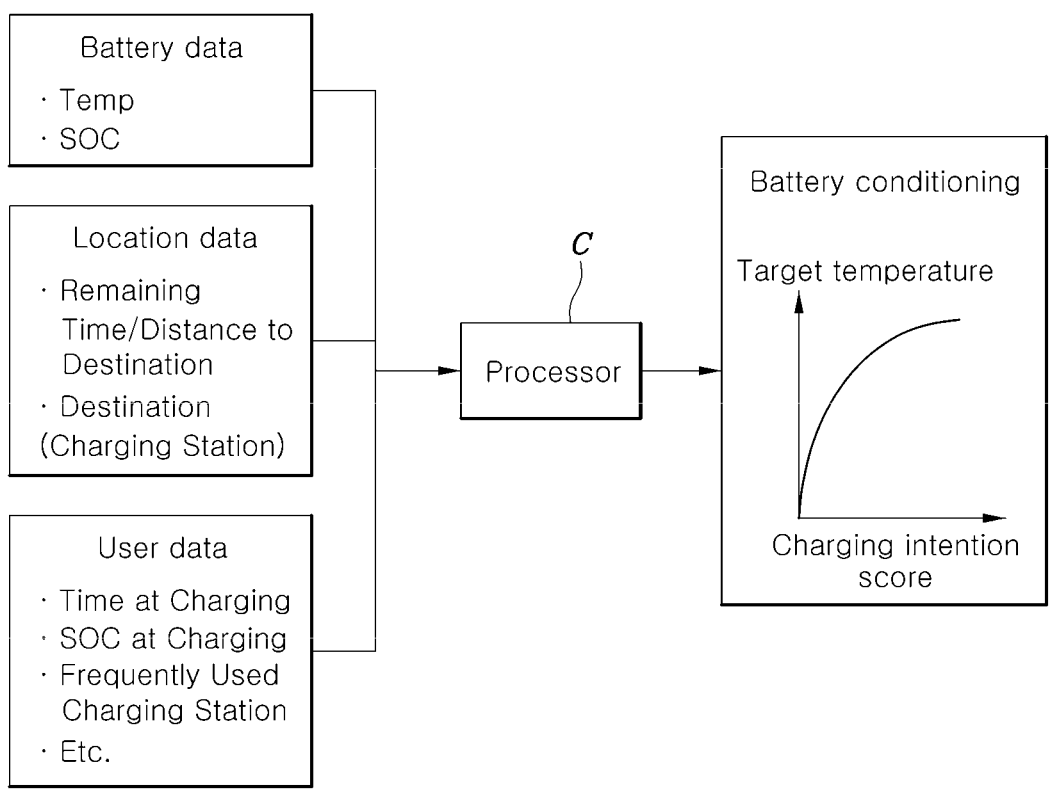
FIG. 2 is a block diagram showing determination factor data of an example system for conditioning a vehicle battery.

FIG. 2 is a block diagram showing determination factor data of an example system for conditioning a vehicle battery. Specifically, the determination factor data may include, for example, a battery condition, driving information, location information, and/or user data (e.g., vehicle charging history) utilized as training data.

The information about a battery condition may include battery SOC and/or battery temperature. When the battery SOC is low, the battery recharging performance may be high. When the battery temperature is unusual (e.g., outside a temperature range that is considered normal), the battery temperature may need to be normalized, and thus the battery temperature may be a factor by which a degree of normalization is determined.

The location information may include a location of a charging station, whether or not a charging station is currently set as a destination is set, a comparison between a distance or a time to the destination and an available driving distance, remaining battery charge (e.g., SOC) after arrival at the destination, etc. Based on this information, it may be possible to determine whether battery recharging in a near future is expected or not (e.g., a probability value of an expected visit to a charging station within the next time window), when the battery will be recharged, to what extent to carry out the battery conditioning, etc.

The user data (e.g., vehicle charging history) may include an expected time of recharging, records (e.g., history) about battery SOC at recharging (e.g., when recharging is initiated), charging schedule (e.g., what time of the day and/or what day of the week that vehicle charging is most typically performed, etc.) associated with a vehicle and/or driver, and/or frequently used charging station(s) associated with a vehicle and/or driver. All this information may be based on past data (e.g., vehicle charging history), and may be used as training data to predict future time and location of battery charging.

The processor may aggregate the determination factor data, generate a grade (e.g., rating) by using a result of the aggregation, and determine the target temperature of the battery based on the grade. Then, the thermal management system may be controlled based on the target temperature of the battery.

If the battery is out of the normal (e.g., predetermined) temperature range, the processor may control the thermal management system so that the battery reaches the target temperature. In other words, even when recharging is expected, if the battery is within the normal temperature range that is considered to be good (e.g., having recharging performance above a predetermined threshold) for recharging the battery, the battery conditioning need not be used. The processor may include a data map (e.g., mappings) composed of grades and corresponding target temperatures.

Grade calculation by aggregation of the data may be possible with a following method.

TABLE 1

| | Data | | Factor |
|---|---|---|---|
| Battery condition (40) | SOC (%) | 0-20 | 0.4 |
| | | 20-60 | 0.3 |
| | | 60-100 | 0.1 |
| | Temperature (° C.) | 0 or less | 0.6 |
| | | 0-10 | 0.4 |
| | | 10-20 | 0.2 |
| | | 30 or above | 0.4 |
| Map information (30) | Charging station set as destination | | 1 |
| | Distant to destination > distance to empty (DTE) | | 0.3 |
| | After arrival at destination, expected SOC < predetermine value | | 0.3 |
| History information (30) | Time of charge (day/time) → predicted (most) typical charging time slot | | 0.5 |
| | Distance to frequently used charging station(s) < DTE | | 0.2 |

As shown in above Table 1, types of data may include a battery condition, location information, and history information. The battery condition may include state of charge (SOC) and temperature. The location information may include whether or not a charging station is set as a destination, a comparison between a distance to the destination and an available driving distance (e.g., distance to empty), and whether expected remaining SOC after arrival at the destination is higher than a predetermined amount (e.g., threshold SOC amount). The history information may include a predicted time slot (e.g., time of the day, day of the week, etc.) of battery charging for a vehicle and/or driver, whether a distance to the (most) frequently used charging station associated with the vehicle and/or driver is within the remaining driving distance (e.g., distance to empty).

Each of these data points may be scored according to whether each data is applicable or not (e.g., degree of applicability), and each data score may be multiplied by a respective weight value (e.g., 0.1, 0.2, 0.3, 0.4, 0.5, 0.6, etc.) as in the equation bellow and multiplied values may be added together, thereby deriving an overall score.

$$\text{Conversion score} = \text{SOC} \times \text{Factor} + \text{Temperature} \times \text{Factor} + \ldots + \text{Learning information} \times \text{Factor} \quad \text{[Equation 1]}$$

The target temperature of the battery according to the derived score may be determined via a data map (e.g., mappings). The score may indicate a predicted likelihood of charging the battery within a predetermined amount of time (e.g., a higher score may imply a higher likelihood that the driver will charge the battery within the next hour).

TABLE 2

| Conversion score | Battery target temperature |
|---|---|
| 0 | Maintaining present state |
| 10 | |
| ... | |
| 50 | 10° C. |
| ... | ... |
| 70 | 20° C. |
| 80 or more | 24° C. |

As shown in the table, when a score (also referred to as a conversion score, an overall score, a charging intention score, etc.) is derived, the battery target temperature of corresponding to the derived score may be obtained, and when the battery temperature is adjusted according to the target temperature, the battery conditioning may be performed to achieve the optimized energy efficiency according to each situation, and thus future battery charging efficiency may be improved, charging time may be reduced, and the durability of the battery may be secured.

FIG. 3 is a flowchart of an example method for conditioning a vehicle battery. The method for conditioning a vehicle battery may include: generating at S100, by the data generator, the determination factor data including vehicle condition data or vehicle driving information data. Specifically, the processor may receive various data. The determination factor data may include battery temperature data. At S200, the processor may determine whether the battery temperature is within the normal (e.g., predetermined) temperature range. If the battery temperature is within the normal temperature range (S200: Yes), the process may terminate without further adjusting the temperature of the battery. However, if the battery is out of the normal temperature range (S200: No), the processor may generate (e.g., calculate) a score at S300. Determining the target temperature may be performed by generating a score, by the processor and based on the determination factor data. If the score is greater than or equal to a predetermined threshold value (S400: Yes), the processor may determine that a future battery charging is expected, and determine the target temperature of the battery based on the determination factor data.

At S600, the processor may determine whether the battery temperature satisfies the target temperature. If the battery temperature satisfies the target temperature (S600: Yes), then the process may return to S100 and repeat the previous steps. If the battery temperature is different from the target temperature (S600: No), then at S700, the processor may control the thermal management system to perform battery conditioning operations based on the target temperature. For example, the thermal management system may cool the battery if the battery temperature is greater than the target temperature. The thermal management system may heat up the battery if the battery temperature is lower than the target temperature.

The system and the method for conditioning a vehicle battery may be configured to check a driver's intention to charge the battery by not only simply depending on a driver's input, but also considering battery condition, driving information, or learning information, and to vary a degree of the battery conditioning in response to a degree of the driver's intention, so that the efficient and precise battery conditioning can be performed.

Although the preferred embodiments of the present disclosure are disclosed for illustrative purposes, those skilled in the art will appreciate that various modifications, additions, and substitutions are possible, without departing from the spirit and scope of the present disclosure.

What is claimed is:

1. A system comprising:
a temperature controller configured to adjust a temperature of a vehicle battery; and
one or more processors configured to:
determine, based on vehicle condition data and vehicle driving information data, a score indicating a predicted likelihood of charging the vehicle battery within a predetermined amount of time;
determine, based on the score, a target temperature of the vehicle battery; and
control, based on the target temperature, the temperature controller to adjust the temperature of the vehicle battery.

2. The system of claim 1, wherein the vehicle condition data comprises battery condition data, and wherein the vehicle driving information data comprises history information data.

3. The system of claim 2, wherein the battery condition data comprises at least one of battery state of charge (SOC) data or battery temperature data.

4. The system of claim 2, wherein the history information data comprises information regarding at least one of:
a most typical charging time slot associated with a vehicle, or
a most frequently used charging station associated with the vehicle.

5. The system of claim 1, wherein the vehicle driving information data further comprises information regarding at least one of:
whether a charging station is set as a destination,
comparison between a distance to the destination and an available driving distance, or
a remaining battery state of charge (SOC) after arrival at the destination.

6. The system of claim 1, wherein the one or more processors are configured to generate the score based on determination factor data, and wherein the determination factor data comprises the vehicle condition data and the vehicle driving information data.

7. The system of claim 6, wherein the one or more processors are configured to determine the target temperature based on a mapping between the score and the target temperature.

8. The system of claim 1, wherein the one or more processors are configured to control the temperature controller to adjust the temperature of the vehicle battery to the target temperature based on the vehicle battery being out of a normal temperature range.

9. A method comprising:
based on vehicle condition data and vehicle driving information data, determining, by one or more processors of a vehicle, a score indicating a predicted likelihood of charging a battery of the vehicle within a predetermined amount of time;
based on the score, determining, by the one or more processors, a target temperature of the battery; and
controlling, based on the target temperature, a temperature controller to cool or heat adjust a temperature of the battery.

10. The method of claim 9, wherein the vehicle condition data comprises battery temperature data.

11. The method of claim 10, wherein the controlling the temperature controller comprises:
determining, by the one or more processors and based on the battery temperature data, whether a temperature of the battery is within a normal temperature range; and
based on the temperature of the battery being out of the normal temperature range, controlling the temperature controller to cool or heat the battery based on the target temperature.

12. The method of claim 9, wherein the determining the target temperature comprises:
generating the score based on determination factor data, wherein the determination factor data comprises the vehicle condition data and the vehicle driving information data.

13. A vehicle comprising:
a battery;
a temperature controller;
one or more processors; and
memory storing instructions that, when executed by the one or more processors, cause the vehicle to:
determine, based on vehicle condition data and vehicle driving information data, a score indicating a predicted likelihood of charging the battery within a predetermined amount of time;
determine, based on the score, a target temperature of the battery; and
control, based on the target temperature, the temperature controller to adjust a temperature of the battery.

14. The vehicle of claim 13, wherein the instructions, when executed by the one or more processors, cause the vehicle to determine the score based on weighted values of at least one parameter of the vehicle condition data and at least one parameter of the vehicle driving information data.

15. The vehicle of claim 14, wherein the at least one parameter of the vehicle condition data comprises at least one parameter indicating a condition of the battery of the vehicle, and wherein the at least one parameter of the vehicle driving information data comprises at least one of:
a difference between a distance to a set destination and an available driving distance,
an expected remaining battery state of charge (SOC) at the set destination, or
battery charging history data associated with the vehicle.

16. The vehicle of claim 14, wherein the weighted values of the at least one parameter of the vehicle condition data and the at least one parameter of the vehicle driving information data comprises a first weighted value of a state of charge (SOC) of the battery, a second weighted value of a temperature of the battery, and a third weighted value of at least one parameter of battery charging history data associated with the vehicle.

17. The vehicle of claim 14, wherein the weighted values of the at least one parameter of the vehicle condition data and the at least one parameter of the vehicle driving information data comprises a first weighted value of a difference between a distance to a set destination and an available driving distance, a second weighted value of an expected remaining battery state of charge (SOC) at the set destination, and a third weighted value of at least one parameter of battery charging history data associated with the vehicle.

* * * * *